Dec. 20, 1966 SETURŌ KINBARA 3,293,603

COMPARING AND SELECTING CIRCUIT FOR DIGITAL NUMBERS

Filed March 12, 1963 2 Sheets-Sheet 2

INVENTOR.
SETURŌ KINBARA
BY Otto John Munz
ATTORNEY

Dec. 20, 1966 SETURŌ KINBARA 3,293,603

COMPARING AND SELECTING CIRCUIT FOR DIGITAL NUMBERS

Filed March 12, 1963 2 Sheets-Sheet 1

| X Y | r | e | s |
|---|---|---|---|
| < | − | + | + |
| = | + | − | + |
| > | + | + | − |

INVENTOR.
SETURŌ KINBARA
BY Otto John Munz
ATTORNEY.

United States Patent Office 3,293,603

Patented Dec. 20, 1966

3,293,603

COMPARING AND SELECTING CIRCUIT FOR DIGITAL NUMBERS

Seturo Kinbara, Tokai-mura, Naka-gun, Ibaraki-ken, Japan, assignor to Nihon Genshiryoku Kenkyu Sho, Tokyo, Japan Filed Mar. 12, 1963, Ser. No. 264,490

Claims priority, application Japan, Mar. 27, 1962, 37/11,255

3 Claims. (Cl. 340—146.2)

This invention relates to a logic circuit in which a plurality of digital numbers are compared and consequently selected, and more particularly relates to a logic circuit in which the magnitude of the same order of two digital numbers is discriminated.

Generally, it is necessary, in processing the information of a digital circuit, to compare and discriminate the magnitude of two digital numbers. When the values of two digital numbers are directly compared, comparison of figures of the same order of two digital numbers can be easily operated by a binary code, a decimal code or any other code operation through a process in which the two values are converted into the analogous quantities of a voltage or a current. However, in order to discriminate the difference in the magnitude of two digital numbers over all the orders, if it is assumed that the two digital numbers have the same figures the figure of the highest order should be discriminated first in accordance with the relations between the figures of the two numbers. The discriminating circuits stated above have been constructed, heretofore, by means of logic circuits, but in the circuits it was necessary to employ a lot of parts and therefore the operation was complicated.

Therefore, it is an object of the invention to provide a simple digital circuit in which a plurality of digital numbers are compared and consequently selected.

Figure 2:
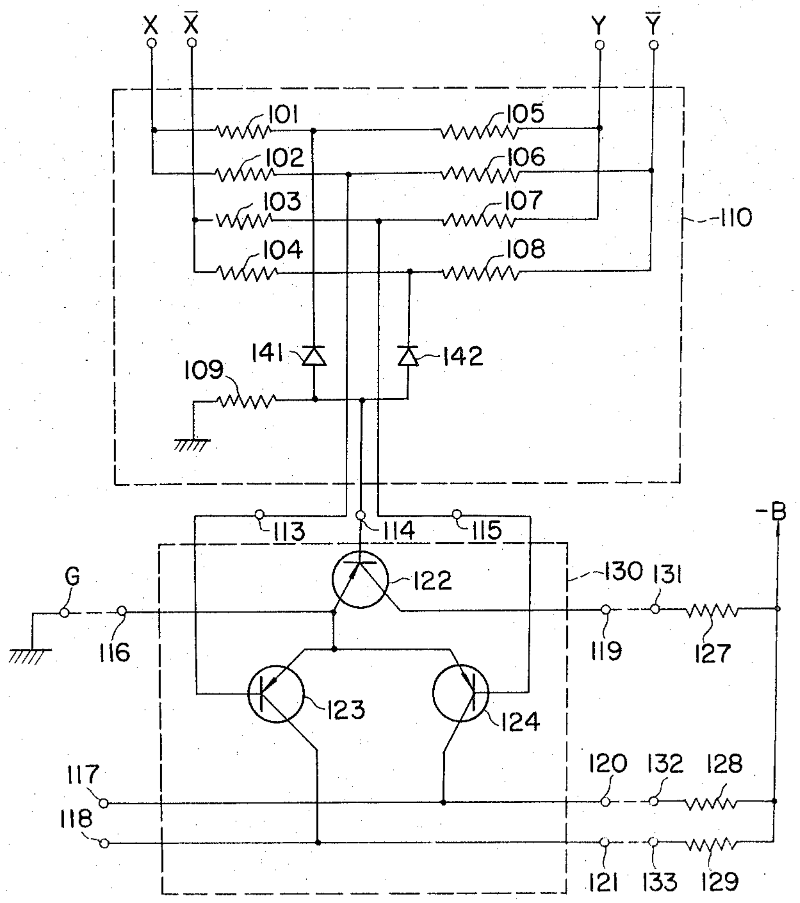
Figures 1, 3:
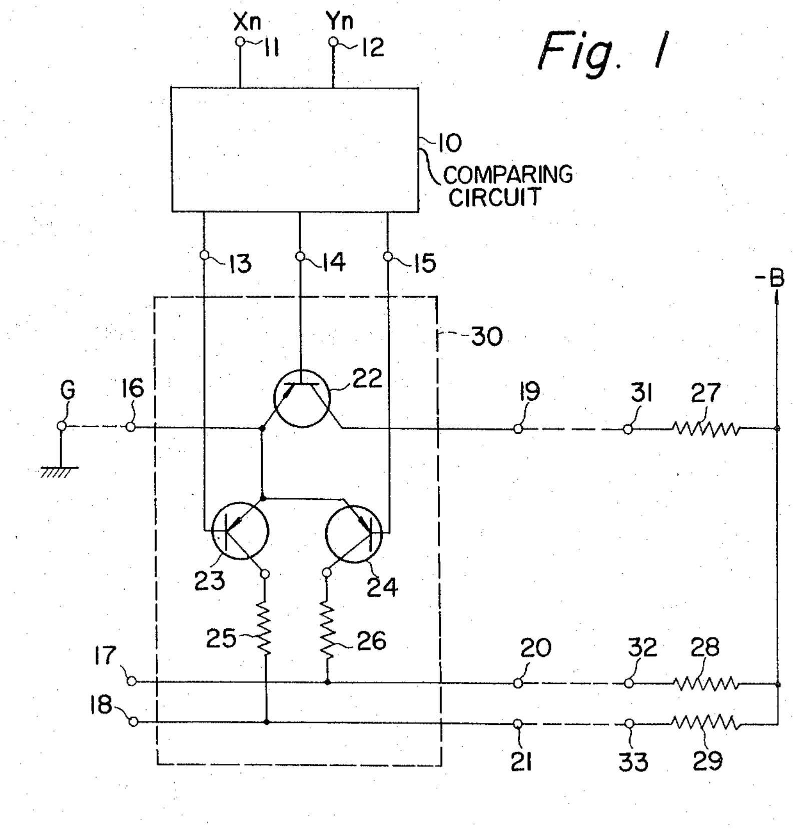

It is a further object of the invention to provide a comparing logic circuit in which the switching characteristics of a transistor are utilized so that the construction of the logic circuit can be simplified. These objects and advantages to the invention will become readily apparent from the following detailed description taken in connection with the accompanying drawings, in which:

FIG. 1 is a connection diagram showing a basic form of the comparing circuit provided in accordance with the present invention, FIG. 2 is an embodiment of the comparing circuit shown in FIG. 1 which is utilized in a binary code operation, and FIG. 3 explains the working status of the comparing circuit shown in FIG. 1.

It is to be understood that the comparing circuit of the invention has a figure column for each figure of the digital numbers to be compared and to be selected. In FIG. 1, the circuit for the $n$ figure column, is shown with its connections to the circuits of the columns corresponding to figures of adjacent order. For each figure, the magnitude of the basic number and the number to be compared with the base number is discriminated and one of three outputs shown in FIG. 1 is obtained.

It is assumed that $n$ figure $Xn$ of the base number X and $n$ figure $Yn$ of number Y to be compared with the number X are applied to input terminals 11 and 12 of comparing circuit 10, respectively and that each of the numbers X and Y has $n$ figures. Three outputs $r$, $e$, and $s$ which have the relation shown in FIG. 3 are represented at output terminals 13, 14 and 15 of comparing circuit 10, respectively, in accordance with the magnitude of $n$ figure $Xn$ of number X and $n$ figure $Yn$ of number Y. It is also assumed that comparing circuit 10 has a conventional circuit of construction publicly known. Circuit 30 shown by the broken lines in FIG. 1 determines the difference between the figures. Switching circuit 30 comprises three transistors 22, 23 and 24 per figure and the base electrode, the emitter electrode and the collector electrode of transistor 22 are connected, respectively, to output terminal 14 of comparing circuit 10, input terminal 16 of switching circuit 30 and output terminal 19 of switching circuit 30. The base electrode, the emitter electrode and the collector electrode of transistor 23 are, respectively connected to output terminal 13 of comparing circuit 10, terminal 16 of switching circuit 30 and terminal 18 of switching circuit 30 through resistance 25. The base electrode, the emitter electrode and the collector electrode of transistor 24 are, respectively, connected to output terminal 15 of comparing circuit 10, terminal 16 of switching circuit 30 and terminal 17 of switching circuit 30 through resistance 26.

The connections of the unit switching circuit, such as circuit 30, are as follows: terminals 16, 17 and 18 of switching circuit 30 are connected to terminals 19, 20 and 21 of a switching circuit which stands at the next higher figure and terminals 19, 20 and 21 of switching circuit 30 are connected to terminals 16, 17 and 18 of a switching circuit which stands at the next lower figure.

The construction of the switching circuit is described as follows: a plurality of unit switching circuits 30, whose number corresponds to the figure of the base number and the number to be compared, are connected in cascade, terminal 16 of switching circuit 30 in the highest figure is connected to the ground through terminal G and terminals 17 and 18 of the same switching circuit 30 are open. Output terminals 19, 20 and 21 of switching circuit 30 in the lowest figure are connected to terminals 31, 32 and 33, respectively. Terminals 31, 32 and 33 are connected through resistance 27, 28 and 29 respectively, to electric source —B.

The whole operation of switching circuit 30 described above is explained hereinafter. Assuming, for example, number X is smaller than number Y in the highest figure, that is $X<Y$, since outputs $r$, $e$ and $s$ appearing at terminals 13, 14 and 15, respectively, are —, + and +, as shown in FIG. 3, current in switching circuit 30 flows through the path from terminal G passing through terminal 16, transistor 23, resistance 25, terminal 21, terminal 18 of the next figure, terminal 21 of the same figure, terminal 23 and resistance 29 to electric source —B. The fact that $X<Y$, can be detected without connection with the lower figure by measuring the potential drop across resistance 29 at terminal 33. If, for example, number X is larger than number Y in the highest figure, that is $X>Y$, since outputs $r$, $e$ and $s$ are respectively +, + and —, current in switching circuit 30 flows through the path from terminal G passing through terminal 16, transitor 24, resistance 26, terminal 20 terminal 17 of the next figure, terminal 20 of the same figure, terminal 32 and resistance 28 to electric source —B. Therefore, the fact $X>Y$, can be detected by measuring the potential drop across resistance 28 at terminal 32. Further, for example, if number X is equal to number Y in the highest figure, that is $X=Y$, outputs $r$, $e$ and $s$ are respectively +, — and + and current flows through the path from terminal G passing through transistor 22 to terminal 19. Under this condition current flows into the input terminal of the next lower figure, which corresponds to terminal 16 of switching circuit 30, from terminal 19 and the difference between numbers X and Y is compared in the next lower figure.

If the operations stated above are put in order, when $X<Y$, output appears at terminal 33, when $X>Y$, output appears at terminal 32. When $X=Y$, output appears at terminal 19, the output is supplied to the next lower figure, and when number X is equal to number Y throughout the whole figure, an output appears at terminal 31.

Since the potential drop generated across resistor 25 or 26 indicates that a discriminating signal is taken out from the figure of the number, the potential drop can be utilized in a different control processing or an operating process.

An embodiment of the comparing circuit of subject invention which is applied in a binary code circuit is shown in FIG. 2. The items of the parts shown in FIG. 2 are exemplified as follows:

| | |
|---|---|
| Resistance **101, 102, 103, 104, 105, 106 107, 108** | 47 K ohm |
| Resistance **109** | 33 K ohm |
| Resistance **127, 128, 129** | 2.7 K ohm |
| Diode **141, 142** | 1N34 |
| Transistor **122, 123, 124** | 2SA206 |
| —B | —10 volt |

As the circuit construction described above can be operated so that the potential drop per transistor is less than about 0.07 volt, the total number of the figure of numbers X and Y can be easily set up to 20 figures or to 30 figures.

As stated above, the circuit provided in accordance with subject invention can be constructed by three transistors per figure, therefore, the circuit not only is simpler than a conventional logic circuit but also effects an amplifying function per figure due to the transistor action so that any further regenerative amplification is not necessary even when the number of figures increases. Consequently, as any complication due to the regenerative amplification can be eliminated and there is no time delay, speedy operation can be expected as well as the simultaneous on and off switching of the transistors for each figure. Further, as the potential drop per transistor can be made less than 0.1 volt the comparing and selecting circuit in accordance with the present invention is provided with the effect in which the comparing circuit can be applied to the base number and the number to be compared with whose figures reach from thirty to forty.

What is claimed is:

1. A comparing and selecting circuit for digital numbers comprising three transistors provided per figure of a base number and a number to be compared with the base number, three control signals generated in accordance with the magnitude of the two numbers in the same figure and means for conducting only one of said three transistors through the combination of said three control signals to provide a comparison output.

2. A comparing and selecting circuit for digital numbers as in claim 1 and means transmitting the conducting state to the next figure in cascade and to discriminate the magnitude of the two numbers beginning with the highest figure of the two numbers.

3. A comparing and selecting circuit for digital numbers comprising three transistors provided per figure of a base number and a number to be compared with the base number, resistances inserted in the collector circuits of two of said three transistors only one of which operates when a difference is detected between the figures of said two numbers and means to select a figure in which a signal discriminating the magnitude of said two numbers is generated by means of the potential drop produced across the resistance in the collector circuit of the operating transistor.

References Cited by the Examiner

UNITED STATES PATENTS 3,090,942 3/1963 Gruenz ________ 340—146.2

MALCOLM A. MORRISON, *Primary Examiner.*

ROBERT C. BAILEY, *Examiner.*

M. J. SPIVAK, *Assistant Examiner.*